(12) United States Patent
Barabash et al.

(10) Patent No.: US 8,819,211 B2
(45) Date of Patent: Aug. 26, 2014

(54) DISTRIBUTED POLICY SERVICE

(75) Inventors: Katherine Barabash, Haifa (IL); Rami Cohen, Haifa (IL); Vinit Jain, Austin, TX (US); Renato J. Recio, Austin, TX (US); Benny Rochwerger, Zichron Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/556,769

(22) Filed: Jul. 24, 2012

(65) Prior Publication Data

US 2012/0290703 A1 Nov. 15, 2012

Related U.S. Application Data

(63) Continuation of application No. 13/107,434, filed on May 13, 2011.

(51) Int. Cl.
*G06F 15/173* (2006.01)

(52) U.S. Cl.
USPC ............ 709/223; 709/238; 709/225; 709/227

(58) Field of Classification Search
USPC .................................. 709/223, 238, 225, 227
See application file for complete search history.

(56) References Cited

U.S. PATENT DOCUMENTS

| | | | |
|---|---|---|---|
| 6,587,455 B1 * | 7/2003 | Ray et al. ...................... | 370/352 |
| 7,463,587 B2 * | 12/2008 | Rajsic et al. ................. | 370/238 |
| 7,953,865 B1 * | 5/2011 | Miller et al. .................. | 709/227 |
| 8,539,545 B2 * | 9/2013 | Kartha et al. ..................... | 726/1 |
| 2007/0130366 A1 * | 6/2007 | O'Connell et al. ........... | 709/238 |
| 2008/0008202 A1 * | 1/2008 | Terrell et al. .................... | 370/401 |
| 2009/0063706 A1 * | 3/2009 | Goldman et al. ............. | 709/250 |
| 2009/0138577 A1 | 5/2009 | Casado et al. ................ | 709/220 |
| 2009/0288084 A1 * | 11/2009 | Astete et al. ...................... | 718/1 |
| 2009/0327471 A1 * | 12/2009 | Astete et al. .................. | 709/223 |
| 2010/0107162 A1 * | 4/2010 | Edwards et al. .................. | 718/1 |
| 2010/0257263 A1 | 10/2010 | Casado et al. ................ | 709/223 |
| 2011/0307715 A1 * | 12/2011 | Diab ............................. | 713/300 |

OTHER PUBLICATIONS

Wang et al., "Design for Configurability: Rethinking Interdomain Routing Policies from the Ground Up," IEEE Journal Apr. 2009, vol. 27, Issue 3, p. 336-348.

Mockapetris, "Domain Names—Concepts and Facilities," Network Working Group, Request for Comments, RFC 1034, Internet Engineering Task Force, Nov. 1987, pp. 1-54.

(Continued)

*Primary Examiner* — Wing F Chan
*Assistant Examiner* — Benjamin M Thieu
(74) *Attorney, Agent, or Firm* — Van Leeuwen & Van Leeuwen; Matthew W. Baca

(57) ABSTRACT

According to one embodiment of the present disclosure, an approach is provided in which a policy server receives a request for a policy from a requestor. The policy server identifies an initiating virtual machine; the initial virtual machine's corresponding virtual network; and a destination virtual machine. Next, a policy corresponding to sending data from the first virtual machine to the second virtual machine is selected. The policy includes one or more logical references to the virtual network and does not include a physical reference to a physical entity located on a physical network. In turn, a physical path translation corresponding to the selected policy is identified and sent to the requestor.

6 Claims, 12 Drawing Sheets

(56) References Cited

OTHER PUBLICATIONS

Mockapetris, "Domain Names—Implementation and Specification," Network Working Group, Request for Comments, RFC 1035, Internet Engineering Task Force, Nov. 1987, pp. 1-54.

Casado et al., "Rethinking Enterprise Network Control," IEEE/ACM Transactions on Networking, vol. 17, No. 4, Aug. 2009, pp. 1270-1283.

Casado et al., "Virtualizing the Network Forwarding Plane," ACM PRESTO 2010, Nov. 2010, 6 pages.

Davy et al., "Towards a Policy-based Autonomic Virtual Network to support Differentiated Security Services," International Conference on Telecommunications and Multimedia,TEMU, Ierapetra, Crete, Greece, Jul. 16-18, 2008, 8 pages.

Office Action for U.S. Appl. No. 13/107,350 (Barabash et al., "Virtual Managed Network," filed May 13, 2011), U. S. Patent and Trademark Office, mailed Jan. 29, 2013, 17 pages.

Office Action for U.S. Appl. No. 13/558,815 (Barabash et al., "Virtual Managed Network," filed Jul. 26, 2012), U. S. Patent and Trademark Office, mailed Jan. 30, 2013, 13 pages.

* cited by examiner

Policy Table 1000

| INITIATING VM | DESTINATION VM | POLICY |
|---|---|---|
| VM 1 | ANY | Must Go Through Firewall |
| VM 1, VM-2, VM-5 | VM-7, VM-8 | Data Must Be Dropped |
| VM-3 Port 443 | ANY | Data Must Go Through SSL Accellerator |
| ANY | VM-3 Port 443 | Data Must Go Through SSL Accelerator |
| ... | ... | ... |

DISTRIBUTED POLICY SERVICE

RELATED APPLICATION

This application is a continuation of U.S. application Ser. No. 13/107,434, filed May 13, 2011, titled "Distributed Policy Service," and having the same inventors as the above-referenced application.

BACKGROUND

The present disclosure relates to a distributed policy service and more specifically, to a distributed policy service that manages logical policies for virtual machines that communicate over virtual networks.

Physical networks include switches and routers that transport data between host computing systems, storage locations, and other computing entities. While virtualization technology enables system administrators to shift physical servers into a "virtual" domain, the same level of virtualization is not available from a network policy perspective. In many systems involving entities that are dynamically managed by one or more independent administrative authorities, it may be required to maintain a policy structure such that each administrative authority is able to maintain individual policies that are applied to virtual networks.

BRIEF SUMMARY

According to one embodiment of the present disclosure, an approach is provided in which a policy server receives a request for a policy from a requestor. The policy server identifies an initiating virtual machine; the initiating virtual machine's corresponding virtual network; and a destination virtual machine. Next, a policy corresponding to sending data from the first virtual machine to the second virtual machine is selected. The policy includes one or more logical references to the virtual network and does not include a physical reference to a physical entity located on a physical network. In turn, a physical path translation corresponding to the selected policy is identified and sent to the requestor.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 10 is a table showing policies that correspond to initiating and destination virtual machines;

DETAILED DESCRIPTION

Figure 1:
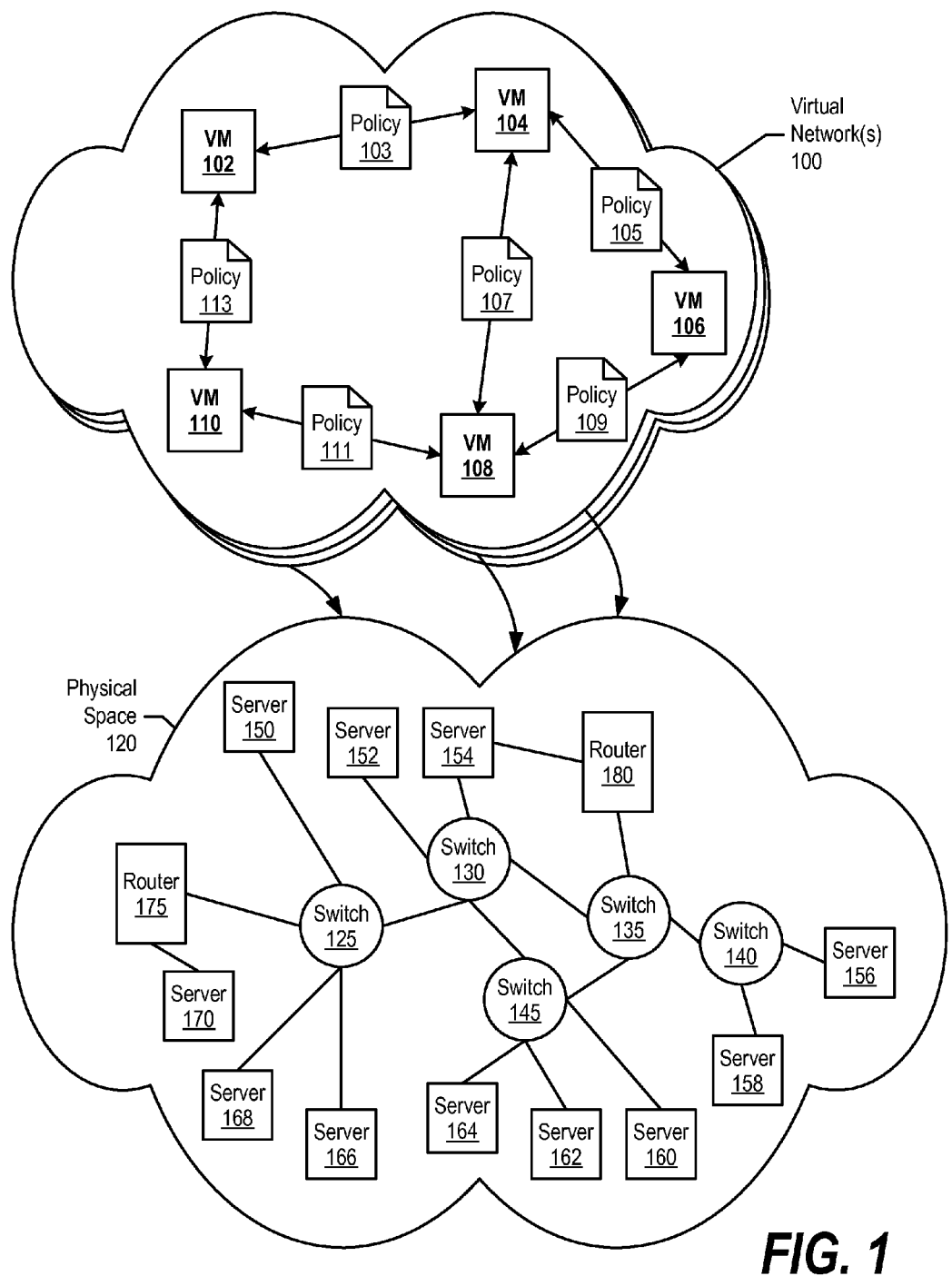
FIG. 1 is a diagram showing virtual network abstractions that overlayed onto a physical space.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

FIG. 1 is a diagram showing virtual network abstractions that are overlayed onto a physical space. Virtual networks 100 include policies (e.g., policies 103-113) that provide an end-to-end virtual connectivity between virtual machines (e.g., virtual machines 102-110). Each of virtual networks 100 corresponds to a unique virtual identifier. This allows concurrent operation of multiple virtual networks over physical space 120. As those skilled in the art can appreciate, some of virtual networks 100 may include a portion of virtual machines 102-110, while other virtual networks 100 may include different virtual machines and different policies than what is shown in FIG. 1.

When an "initiating" virtual machine sends data to a "destination" virtual machine, a policy corresponding to the two virtual machines describes a logical path on which the data travels (e.g., through a firewall, through an accelerator, etc.). In other words, policies 103-113 define how different virtual machines communicate with each other (or with external networks). For example, a policy may define quality of service (QoS) requirements between a set of virtual machines; access controls associated with particular virtual machines; or a set of virtual or physical appliances (equipment) to traverse when sending or receiving data (See FIG. 10 and corresponding text for further details). In addition, some appliances may include accelerators such as compression, IP Security (IPSec), SSL, or security appliances such as a firewall or an intrusion detection system. In addition, a policy may be configured to disallow communication between the initiating virtual machine and the destination virtual machine.

Virtual networks 100 are logically overlayed onto physical space 120, which includes physical entities such as switches 125-140, servers 150-170, and routers 175-180, and various appliances (e.g., firewalls). While the way in which a policy is enforced in the system affects and depends on physical space 120, virtual networks 100 are more dependent upon logical descriptions in the policies. As such, multiple virtual networks 100 may be overlayed onto physical space 120.

In one embodiment, the virtual network abstractions support address independence between different virtual networks 100. For example, two different virtual machines operating in two different virtual networks may have the same IP address. As another example, the virtual network abstractions support deploying virtual machines, which belong to the same virtual networks, onto different hosts that are located in different physical subnets (includes switches and/or routers between the physical entities). In another embodiment, virtual machines belonging to different virtual networks may be hosted on the same physical host. In yet another embodiment, the virtual network abstractions support virtual machine migration anywhere in a data center without changing the virtual machine's network address and losing its network connection.

Figure 2A:
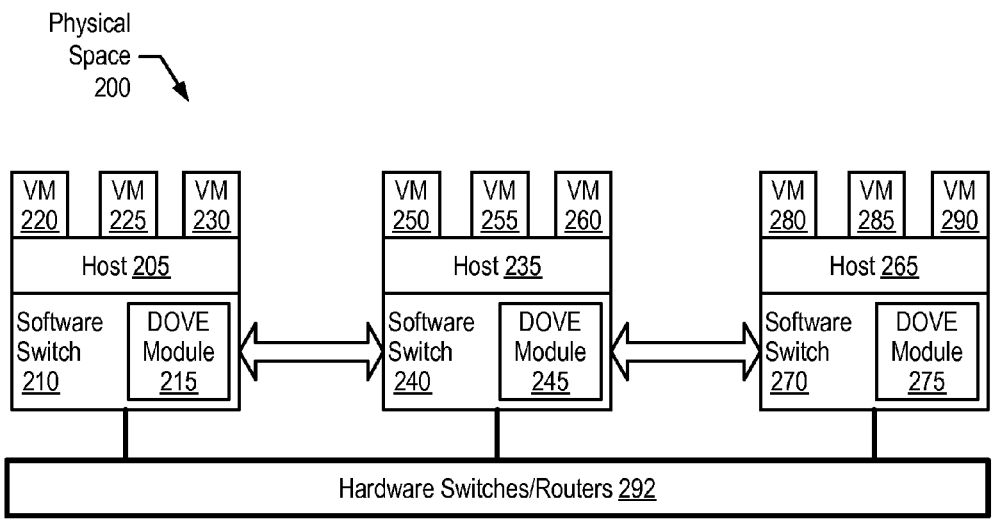
FIG. 2A is a diagram showing distributed overlay virtual network (DOVE) modules executing on host systems that provide an end-to-end virtual network environment between virtual machines.

FIG. 2A is a diagram showing distributed overlay virtual network (DOVE) modules executing on host systems that provide an end-to-end virtual network environment between virtual machines. Physical space 200 includes hosts 205-265, which support virtual machine operations (virtual machines 220-290) that communicate with each other over hardware switches/routers 292. Each of hosts 205-265 employ a software switch (switches 210-270), which includes a distributed overlay virtual network (DOVE) module (DOVE modules 215-275). DOVE modules 215-275 encapsulate data with physical path translations based upon policies, and send the encapsulated data between DOVE modules 215-275 that, in turn, is decapsulated and forwarded to a destination virtual machine. The policies describe, in a logical manner, how data is required to be sent over virtual networks without details of the underlying physical entities that performs particular tasks (see FIGS. 2B, 10, and corresponding text for further details).

Figure 2B:
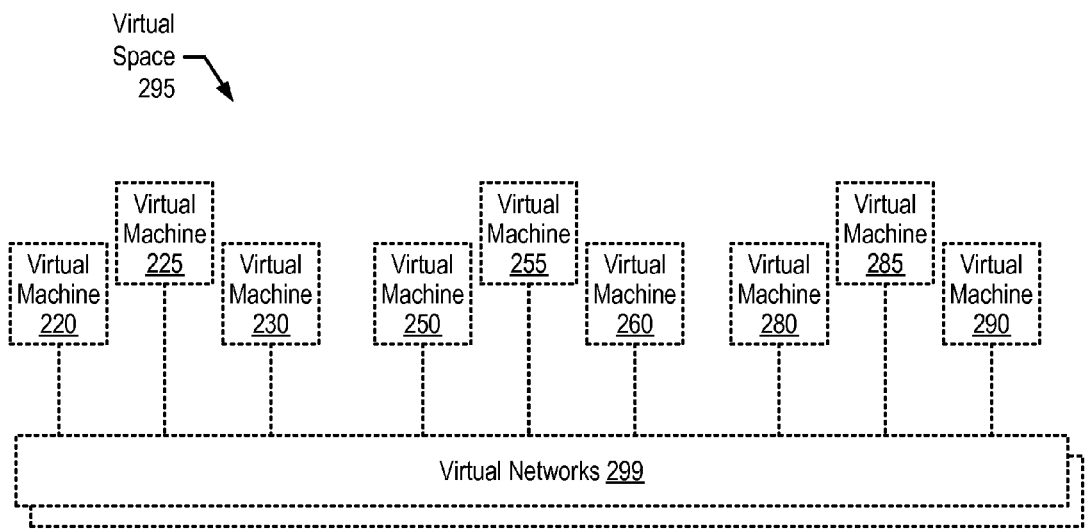
FIG. 2B is a diagram showing virtual machines logically coupled in a virtual network.

FIG. 2B is a diagram showing virtual machines logically coupled in virtual networks. Virtual space 295 represents physical space 200 in a logical form. As can be seen, virtual machines 220-290 communicate with each other over virtual networks 299. Virtual networks 299 represent the connectivity between the virtual machines, which is defined by their corresponding policies. For example, policy "A" may dictate data must pass through a firewall that is sent from virtual machine 220 to virtual machine 290. Although the policy logically describes the data path, the policy does not define the physical path (e.g., physical entity address) that the data must travel.

Figure 3:
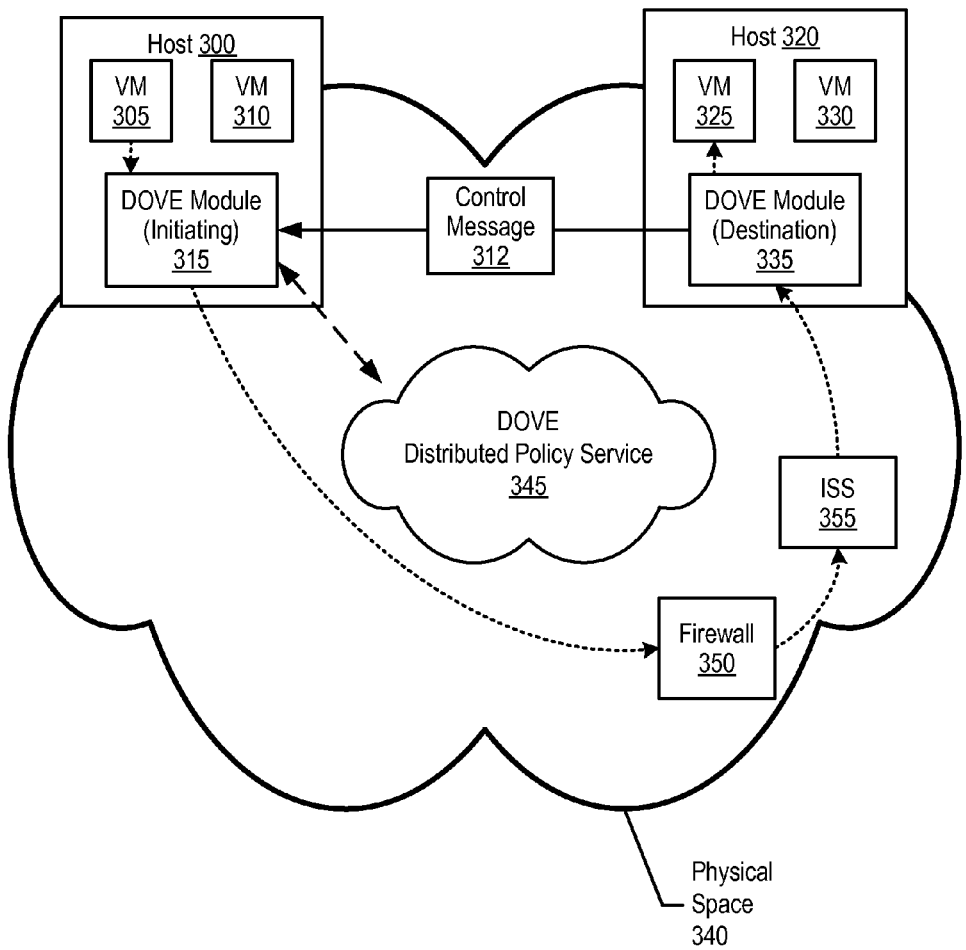
FIG. 3 is a diagram showing an "initiating" virtual machine sending data to a "destination" virtual machine through a physical network that is based upon logical policies.

FIG. 3 is a diagram showing an "initiating" virtual machine sending data to a "destination" virtual machine through a virtual network that is based upon policies. Physical space 340 includes overlayed virtual networks on which host 300 and host 320 communicate. Host 300 includes virtual machines 305-310 and DOVE module 315. DOVE module 315 manages data throughput to/from virtual machines 305-310 by encapsulating/decapsulating the data with a physical path translation corresponding to a policy prior to sending/receiving the data to/from another virtual machine. Host 320 includes virtual machines 325-330 and DOVE module 335. DOVE module 335 manages data throughput to/from virtual machines 325-330 by encapsulating/decapsulating the data prior to sending/receiving the data over a physical network to/from another virtual machine. In other embodiments, DOVE modules 315 and 335 may be implemented as software modules, as hardware extensions, and/or as part of a network card within their corresponding host.

FIG. 3 shows an embodiment when virtual machine 305 sends data to virtual machine 325. As those skilled in the art can appreciate, any of virtual machines 305-330 may send data to any other virtual machine, including a virtual machine on the same host. Virtual machine 305 initiates a data transmission, which DOVE module 315 intercepts. In this embodiment, virtual machine 305 is the initiating virtual machine and DOVE module 315 is the initiating module. DOVE module 315 identifies a corresponding virtual network and acquires a policy that corresponds to virtual machine 305 and "destination" virtual machine 325. In one embodiment, DOVE module 315 checks its local cache and, if one is not available, DOVE module 315 queries DOVE distributed policy service 345 for the policy.

In one embodiment, DOVE module 315 provides an initiating (source) virtual machine identifier, a destination virtual machine identifier, and may also provide a protocol identifier and/or port information to DOVE distributed policy service 345. In turn, DOVE distributed policy service 345 provides a corresponding physical path translation to DOVE module 315. In this embodiment, DOVE distributed policy service 345 maintains virtual definitions and physical definitions to translate the logical policy to a physical path translation. The virtual policy definitions describe data traversal requirements, such as data from virtual network 1 targeted for virtual network 2 must pass through a firewall. The physical definitions include, for example, the virtual machines' corresponding physical host and physical entity attributes (e.g., firewalls, etc.). DOVE distributed policy service 345 is a hierarchically-based policy service that manages policies within a physical network (see FIGS. 5, 6, 8, and corresponding text for further details).

Once DOVE module 315 acquires a physical path translation corresponding to the policy, DOVE module 315 encapsulates the data with a physical path translation and sends the encapsulated data to "destination" virtual machine 325 through "destination" DOVE module 335. The embodiment shows that the policy dictates the data to pass through a firewall (firewall 350) and an internet security system (ISS 355). The policy does not specify a physical entity (e.g., firewall or ISS), but rather logically specifies that the data pass through a firewall and an ISS (see FIG. 10 and corresponding text for further details).

Destination DOVE module 335 decapsulates the data and determines whether the policy corresponding to the physical path translation used for encapsulation is deprecated (outdated). For example, DOVE module 315 may have retrieved an outdated policy from its local cache to encapsulate the data. In one embodiment, DOVE module 335 determines whether the policy used for encapsulation is up to date is by sending a policy number update for the policy used by the encapsulation header to DOVE distributed policy service 345. If the policy is up to date, DOVE distributed policy service 345 sends an acknowledgement. On the other hand, if the policy is stale, DOVE distributed policy service 345 may send a new policy.

If the policy is up-to-date, DOVE module 335 forwards the data to virtual machine 325. However, if DOVE module 335 detects a deprecated policy, DOVE module 335 informs DOVE module 315 via control message 312. In one embodiment, DOVE module 335 may include an updated policy in control message 312. If control message 312 does not include an updated policy, DOVE module 315 may query DOVE distributed policy service 345 for the updated policy. DOVE module 335 may also determine to reject the data or forward the data to virtual machine 325 based on pre-determined configuration parameters (see FIG. 9 and corresponding text for further details).

Figure 4:
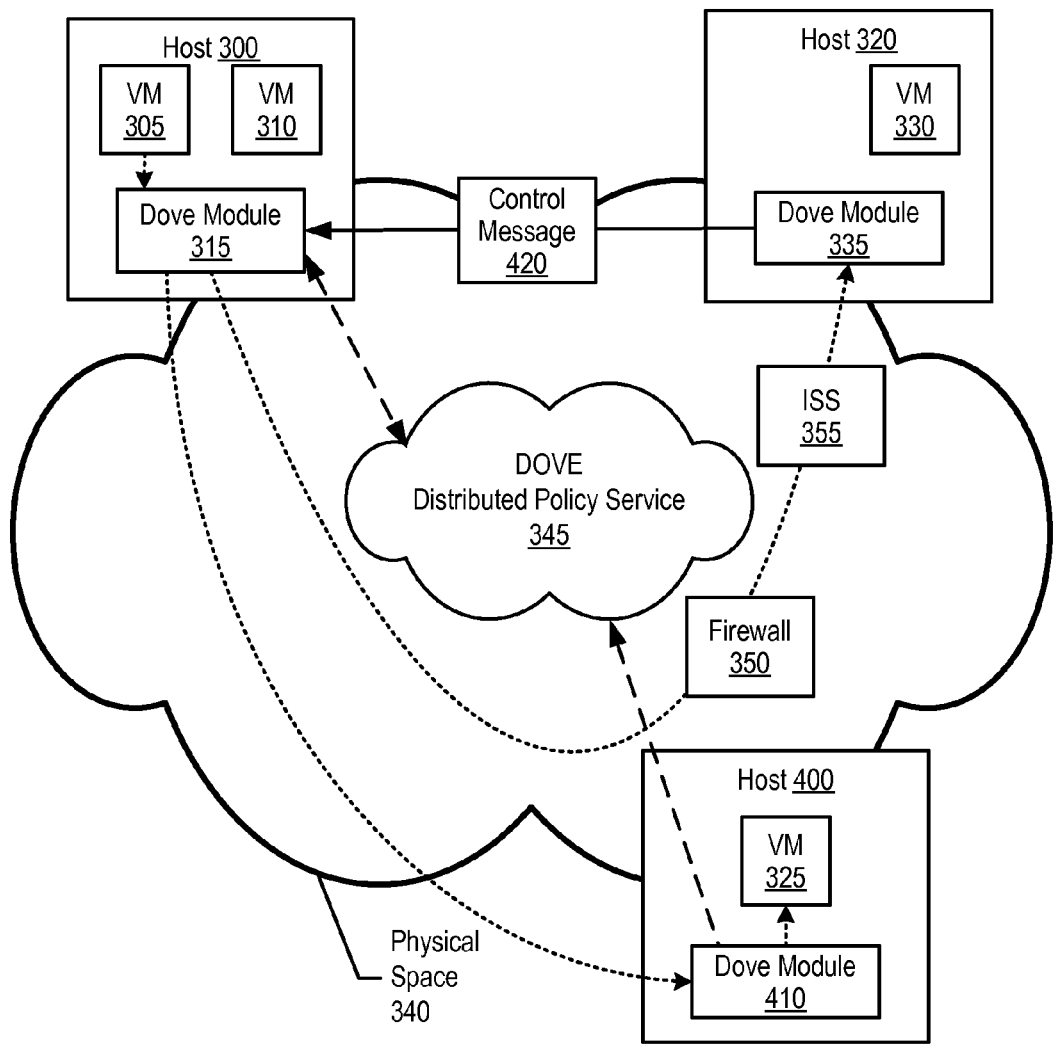
FIG. 4 is a diagram showing a destination module informing an initiating module that a virtual machine has relocated to a different host.

FIG. 4 is a diagram showing a destination module informing an initiating module that a virtual machine has relocated to a different host. FIG. 4 is similar to FIG. 3 with the exception that virtual machine 325 moved to a different host (host 400), such as in order to balance workload between hosts. When virtual machine 325 moves to host 400, DOVE module 410 sends update information to DOVE distributed policy service 345, which updates its policy information that virtual machine 325 is now hosted by host 400.

DOVE module 315 retrieves a policy from its local host, which is deprecated because it indicates that virtual machine 325 still resides at host 320. As such, DOVE module 315 encapsulates the data with a corresponding deprecated physical path translation, which results in the data traversing from DOVE module 315 to DOVE module 335. In turn, DOVE module 335 sends control message 420 to DOVE module 315 that informs DOVE module 315 that the policy is deprecated. As such, DOVE module 315 retrieves an updated policy from DOVE distributed policy service 345, which indicates virtual machine 325 resides on host 400. In turn, DOVE module 315 encapsulates the data with a corresponding updated physical path translation, and sends the data to virtual machine 325 through DOVE module 410 accordingly. Policies may become deprecated for other reasons as discussed above. For example, a logical may be modified by a virtualization administrator or management tool. In this example, the logical policy's sequence number changes (see FIG. 5 and corresponding text for further details). In turn, a logical policy change typically results in a physical path translation.

Figure 5:
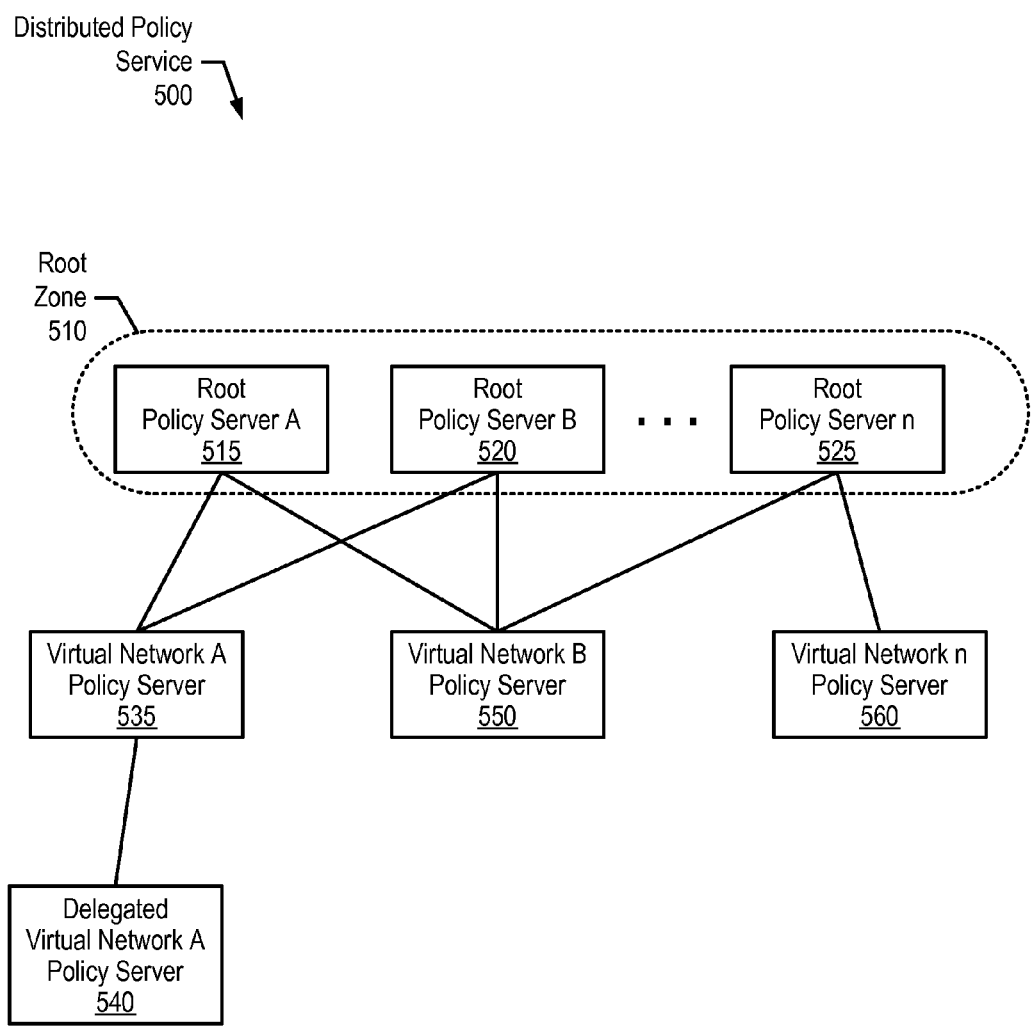
FIG. 5 is a diagram showing a hierarchically-based policy service.

FIG. 5 is a diagram showing a hierarchically-based policy service. Distributed policy service (DPS) 500, in one embodiment, includes a set of application servers that maintain a policy by one or more administrative authorities. In this embodiment, each administrative authority may dynamically add policies, remove policies, update policies, and delegate new policy authorities.

Distributed policy service 500 includes a logical hierarchical structure. Thus, distributed policy service 500 includes root zone 510, which comprises root policy servers 515-525. Each of root policy servers 515-525 may be connected to other main policy authorities, and each policy authority is connected to each of its delegated policy authorities (servers 535, 550, and 560). The hierarchical structure of distributed policy service 500 ensures scalability of service, even in very large systems, where robustness and high availability is achieved by server duplication. The hierarchical structure also enables isolation by having each administrator independently maintain its set of servers.

When an administrator creates a new administrative authority (policy domain), a policy server instance is created and connected to the root servers. The policy server instance exposes, in one embodiment, a set of interfaces and allows a domain administrator to create, change, or remove policies associated with each of the virtual networks and virtual machines in a domain. In addition, sub-domains (delegation) may be created (server 540), which function as a typical domain except that the sub-domains are connected to parent domains instead of a root domain.

Each DOVE module and server may maintain a cache that stores policies that were previously requested. In one embodiment, in order to handle policy updates, each policy may be associated with a sequence number that increases each time the policy is updated. In this embodiment, a deprecated policy is easily detected by other entities or by the policy service. As can be seen, distributed policy service includes policy information servers and policy reference servers. The policy information servers store policies and corresponding physical path translations. The policy reference servers store reference information that indicates which of the policy information servers is responsible for particular policies and/or virtual networks.

Figure 6:
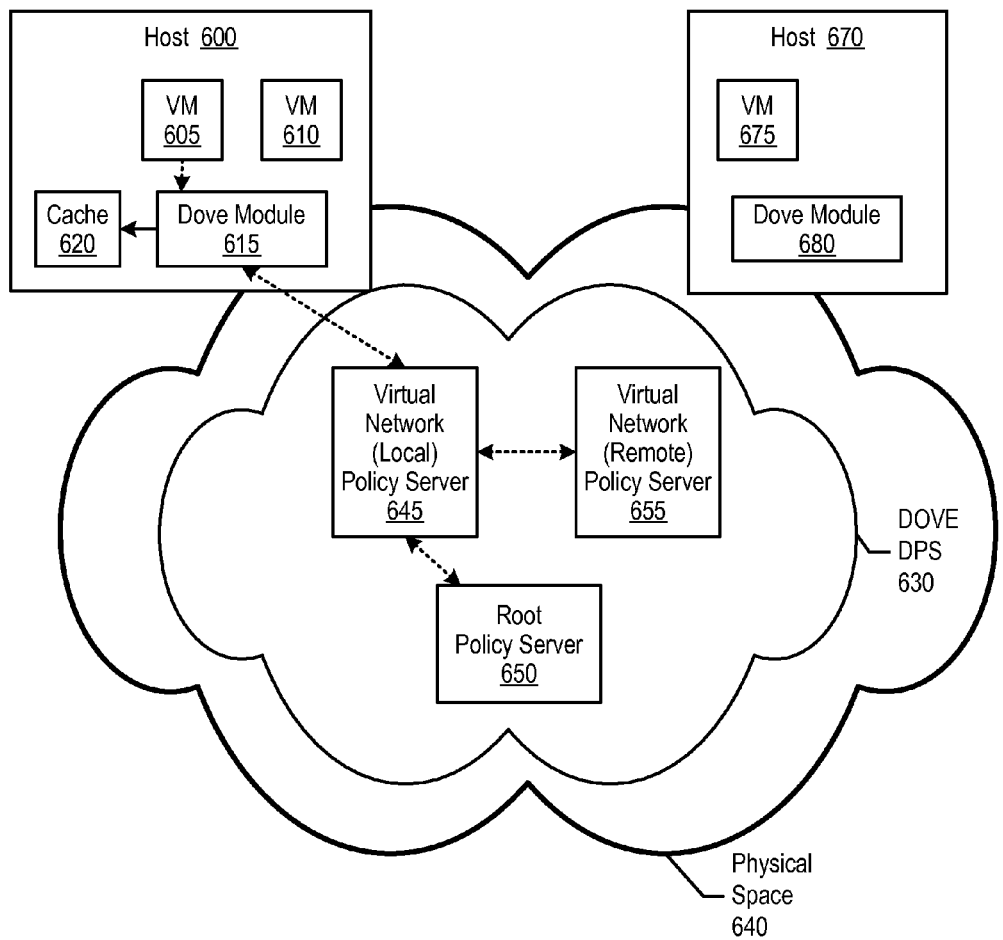
FIG. 6 is a diagram showing a DOVE module querying a distributed policy service for an updated policy.

FIG. 6 is a diagram showing a DOVE module querying a distributed policy service for an updated policy. Host 600 includes virtual machines 605 and 610, which communicate with virtual machine 675 (residing on host 670) over a physical network. DOVE module 615 intercepts data from virtual machine 605 and determines whether local cache 620 includes a policy corresponding to virtual machine 605 and virtual machine 675. If so, DOVE module encapsulates the data and forwards the encapsulated data to virtual machine 675 through DOVE module 680.

When cache 620 does not include a corresponding policy, DOVE module 615 queries virtual network policy server 645 included in DOVE distributed policy service 630, which manages policies pertaining to a virtual network for which virtual machine 605 belongs. In one embodiment, policy servers for different virtual networks (e.g., virtual machine 610 is part of a different virtual network) may be co-located and differentiate policy requests from DOVE module 615 according to a virtual network identifier included in requests.

DOVE distributed policy service 630 is hierarchally-based and, when virtual network policy server 645 does not include a corresponding policy to send to DOVE module 615, virtual network policy server 645 queries root policy server 650 for the policy. In turn, root policy server 650 may send either the policy to virtual network policy server 645 or an indication as to another server to query for the policy (e.g., virtual network policy server 655's ID). If the later occurs, virtual network policy server 645 queries virtual network policy server 655 for the updated policy.

Figure 8:
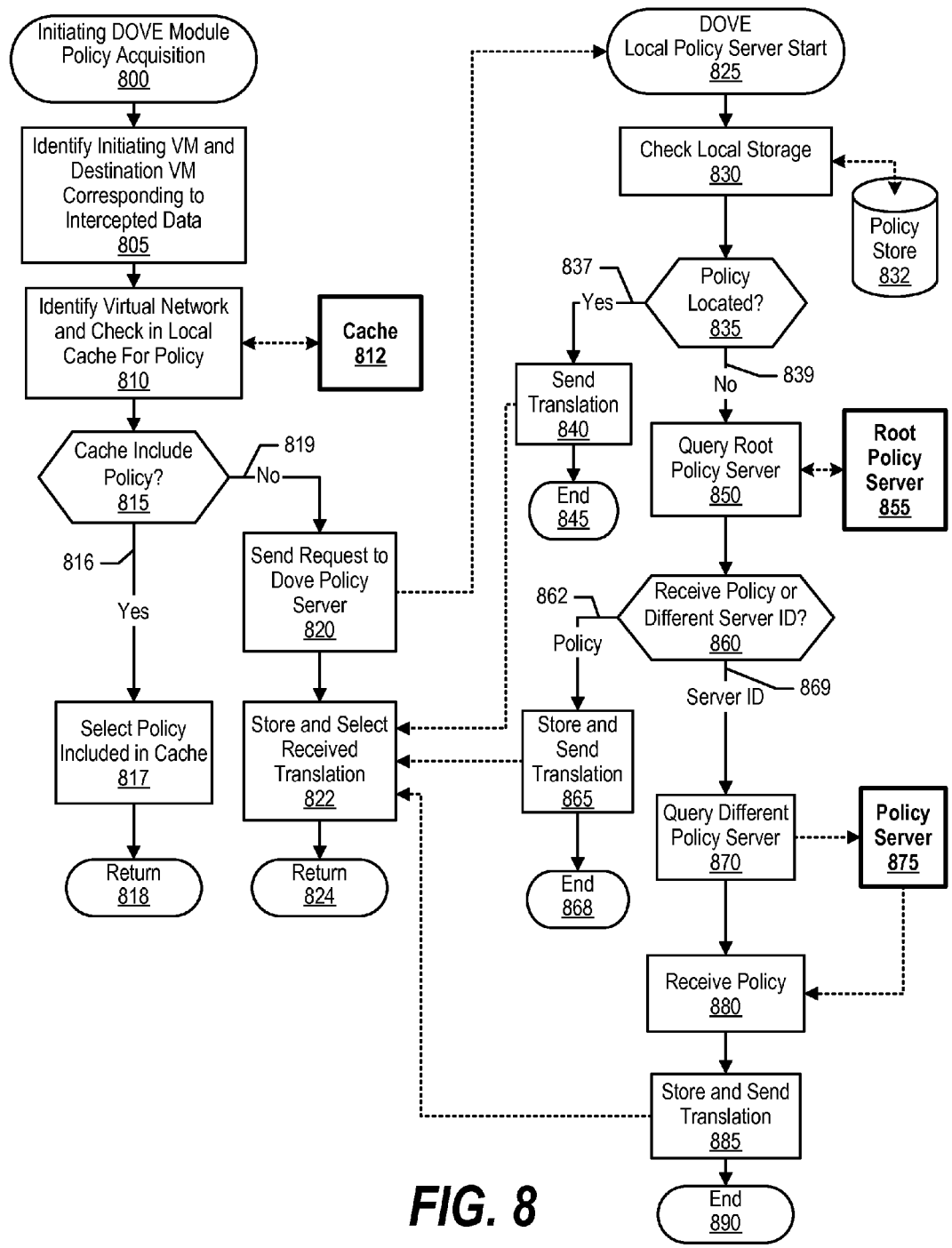
FIG. 8 is a flowchart showing steps taken in a DOVE module acquiring an updated policy from a distributed policy service.

Once virtual network policy server 645 acquires the updated policy, virtual network policy server 645 sends the updated policy to DOVE module 615, which it stores in local cache 620 for subsequent use (see FIG. 8 and corresponding text for further details).

In one embodiment, virtual network policy server 645 informs DOVE module 615 that virtual network policy server 655 is responsible for the requested policy. In this embodiment, DOVE module 615 queries virtual network policy server 655 for the policy.

Figure 7:
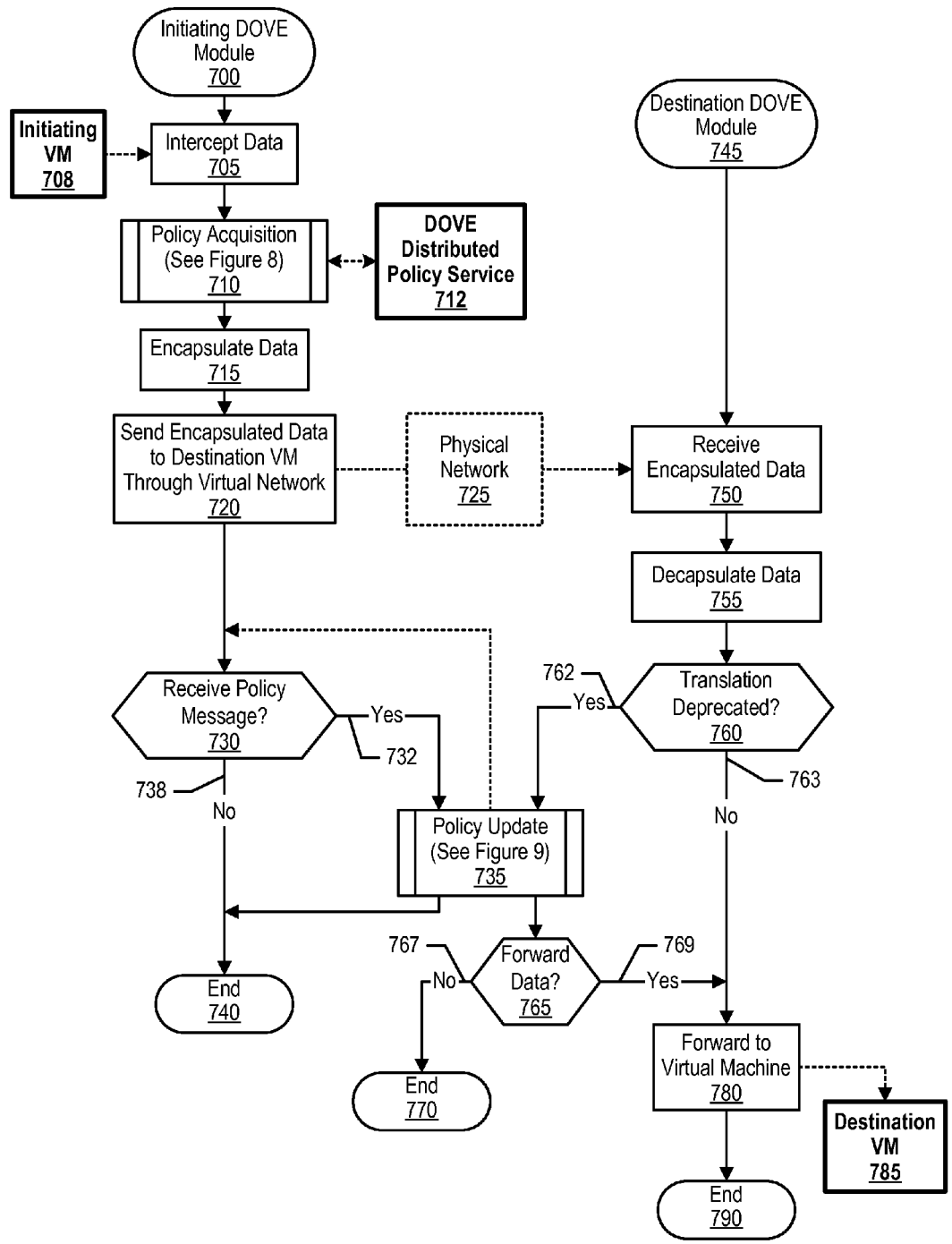
FIG. 7 is a flowchart showing steps taken in sending data from an initiating virtual machine (VM) to a destination virtual machine through a physical network.

FIG. 7 is a flowchart showing steps taken in a DOVE module encapsulating data initiated by a virtual machine (VM) and sending the encapsulated data over a physical network to a destination DOVE module, which decapsulates the data and forwards the decapsulated data to a destination virtual machine. Processing commences at 700, whereupon a distributed overlay virtual network (DOVE) module intercepts data sent by virtual machine 708 at step 705. The module that intercepts the data from the initiating virtual machine 708 is referred to herein as an "initiating" module, such as DOVE module 315 shown in FIG. 3. The initiating module acquires a physical path translation based on a policy that corresponds to initiating virtual machine 708 and the destination virtual machine (destination VM 785) through a series of steps, which include accessing distributed policy service 712 when the initiating module does not include a particular policy in local cache. The policy logically describes how data should be traversed through physical network 725 (see FIG. 10 and corresponding text for further details).

Next, the initiating module encapsulates the data (step 715) and sends the encapsulated data through physical network 725 (step 720) to the destination virtual machine. In one embodiment, the initiating module encapsulates the data with a physical path translation that corresponds to the policy. The physical path translation is a translation from the logical environment to the physical network according to the corresponding policies. In addition, pre-existing policies may be implemented by a physical network administrator. In this embodiment, the physical network administrator may implement a static configuration comprising several possible policies, which are eventually translated to physical network paths. In this embodiment, a DOVE Policy Service maps logical policies to the physical network policies/paths and enforces them by sending packets over their correct paths (e.g., MPLS tags, VLANs in a physical networks, source route in an encapsulation header, etc.).

In another embodiment, translation between policy definition formulated in terms of virtual notions/entities and policy enforcement formulated in terms of physical notions/entities may be dynamically achieved through traffic engineering techniques, such as those discussed above and/or newly developed techniques (e.g., proprietary encapsulation protocol).

Destination module processing commences at 745, whereupon a destination module receives the encapsulated data at 750. The destination module is a DOVE module that corresponds to the destination virtual machine, such as DOVE module 335 shown in FIG. 3.

The destination module decapsulates the data at step 755, and determines whether the physical path translation that encapsulated the data is deprecated (decision 760). In one embodiment, DOVE module 335 determines whether the policy used for encapsulation is up to date is by sending a policy number update for the policy used by the encapsulation header to DOVE distributed policy service 345. If the policy is up to date, DOVE distributed policy service 345 sends an acknowledgement. On the other hand, if the policy is stale, DOVE distributed policy service 345 may send a new policy. If the physical path translation is not deprecated, decision 760 branches to "No" branch 763, whereupon the destination module forwards the data to destination virtual machine 785 at step 780 and ends at 790.

Figure 9:
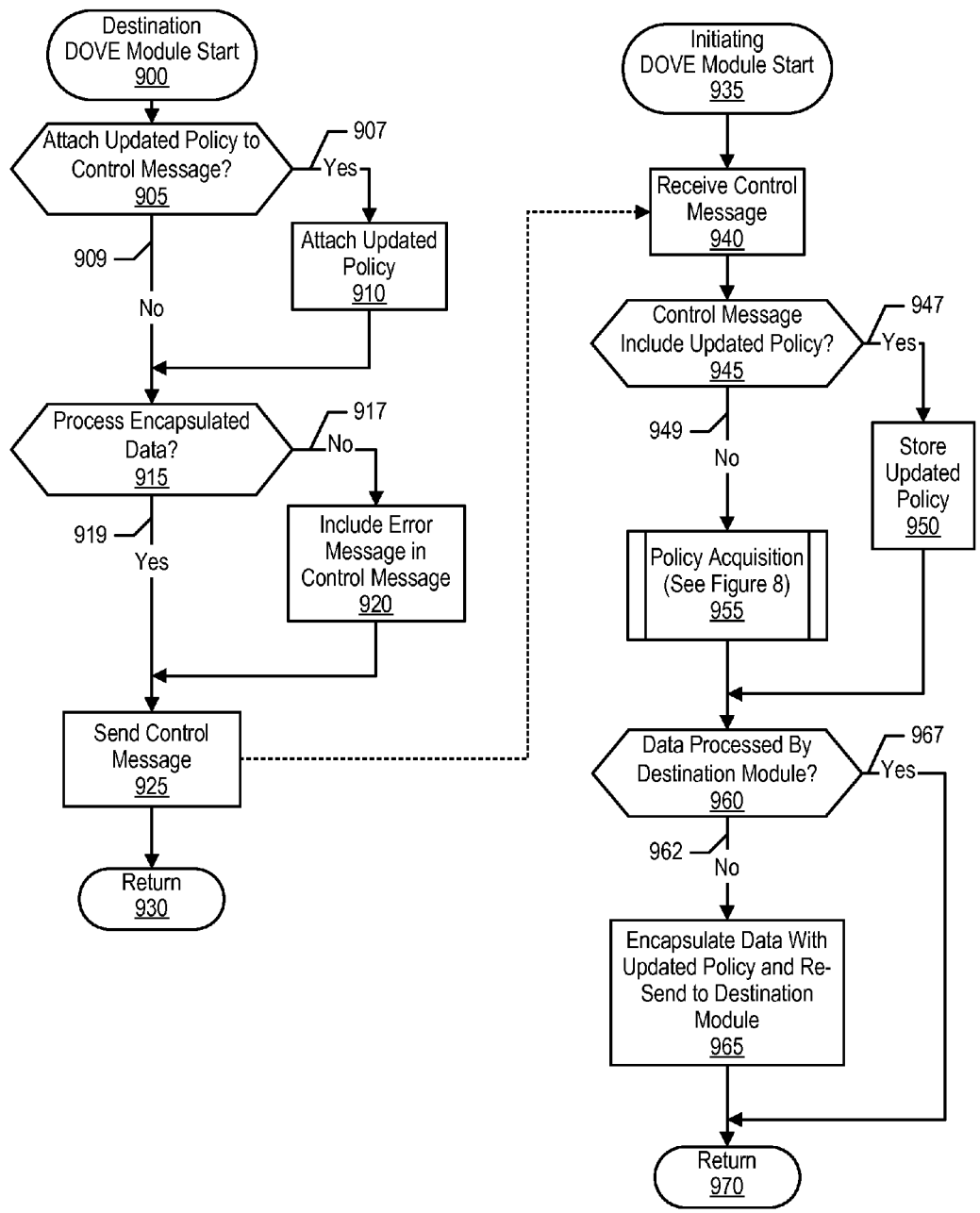
FIG. 9 is a flowchart showing steps taken in a destination module informing an initiating module that a policy received from the initiating module is deprecated.

On the other hand, if the physical path translation is deprecated, decision 760 branches to "Yes" branch 762, whereupon the destination module proceeds through a series of policy update steps, one of which includes informing the initiating module that the recently sent policy is deprecated (pre-defined process block 735, see FIG. 9 and corresponding text for further details).

Referring back to the initiating module, the initiating module determines whether it received a control message from the destination module that indicates the policy is deprecated (decision 730). If the initiating module did not receive a control message, decision 730 branches to "No" branch 738 whereupon processing ends at 740. On the other hand, if the initiating module received a control message, decision 730 branches to "Yes" branch 732, whereupon the initiating module acquires an updated policy, such as from the destination module or distributed policy service 712 (pre-defined process block 735, see FIG. 9 and corresponding text for further details).

Referring back to the destination module, the destination module determines whether to forward the data that was encapsulated with the deprecated physical path translation to destination virtual machine 785 (decision 765). If the destination module determines not to forward the data (e.g., based upon pre-configured parameters), decision 765 branches to "No" branch 767 whereupon processing ends at 770. On the other hand, if the destination module decides to process the data, decision 765 branches to "Yes" branch 769, whereupon the destination module forwards the data to destination virtual machine 785 at step 780, and ends at 790.

FIG. 8 is a flowchart showing steps taken in a DOVE module acquiring an updated policy from a distributed policy service. Initiating module policy acquisition commences at 800, whereupon the initiating module identifies the initiating virtual machine and the destination virtual machine that correspond to data intercepted in FIG. 7 (step 805).

At step 810, the initiating module identifies virtual properties of the communication session between the initiating and the destination virtual machines (communication session properties), and checks its local cache 812 for a corresponding policy. In general, the policy may be defined per communication session properties. In one embodiment, the policy corresponds to one or more criteria, such as the identified virtual networks (initiating virtual machine and destination virtual machine by be on different virtual networks); the initiating virtual machine; the destination virtual machine; the type of communication indicated by, for example, port numbers and upper level protocols, etc. and any liable combination of the above. For example, the policy may indicate that, for HTTP data sent from virtual machine A to virtual machine B, the data must pass through a firewall. (see FIG. 10 and corresponding text for further details).

In another embodiment, as multiple virtual networks are overlaid on top of a shared physical network, the communications between virtual network end points (e.g., virtual machine's virtual network interface) are identified as belonging to a specific network before the policy for the data at hand is retrieved. In this embodiment, each virtual network may be assigned a unique virtual network identifier and, in this embodiment, a mapping of virtual machines to virtual networks mapping are maintained by identifying specific interfaces that the virtual machines couple to inside the virtual switch. In this embodiment, DOVE modules, or an existing hypervisor virtual switch augmented with a DOVE module component, may maintain the mappings.

A determination is made as to whether cache 812 includes a corresponding policy (decision 815). If cache 812 includes a corresponding policy, decision 815 branches to "Yes" branch 816, whereupon the initiating module selects the policy included in cache 812 to encapsulated the data, and returns at 810.

On the other hand, if cache 812 does not include a corresponding policy, decision 815 branches to "No" branch 819, whereupon the initiating module sends a policy request to its local policy server, which resides within a distributed policy service (e.g., policy server 645 residing in distributed policy service 630 shown in FIG. 6).

The local policy server receives the request at 825, and proceeds to check its local storage area (policy store 832) for a policy that corresponds to the initiating virtual machine and the destination virtual machine (step 830). A determination is made as to whether the policy server located a corresponding policy in its local storage area (decision 835). If the policy located a corresponding policy, decision 835 branches to "Yes" branch 837, whereupon the policy server sends the policy (logical policy) to the initiating module at step 840 and ends at 845. In one embodiment, the policy server provides a physical path translation to the initiating module that is based upon the logical policy, which the initiating module utilizes to encapsulate the data. The initiating module receives and stores the physical path translation at step 822 and returns at 824.

Referring back to the local policy server, if the local policy server does not locate a corresponding policy in policy store 832, decision 835 branches to "No" branch 839, whereupon the local policy server queries root policy server 855 at step 850. In one embodiment, the local policy server determines whether it is responsible for the virtual network that corresponding to the initiating virtual machine. If not, the local policy server queries root policy server 855 for an indication as to which other policy server is responsible for the corresponding virtual network.

The local policy server receives a response from root policy server 855, and a determination is made as to whether the response includes the policy or an indication to acquire the policy from a different (remote) policy server (decision 860).

If the local policy server received the policy from root policy server 855, decision 860 branches to "Policy" branch 862, whereupon the local policy server stores the policy in policy store 832 for later retrieval, and sends the policy to the initiating module at step 865, subsequently ending 868. On the other hand, if the local policy server received an indicator pertaining to a different policy server, decision 860 branches to "Server ID" branch 869, whereupon the local policy server queries policy server 875 for the policy.

The local policy server receives the policy from policy server 875 at step 880. In turn, the local policy server stores the policy in policy store 832 for later retrieval, and sends the policy to the initiating module at step 885, subsequently ending 890.

FIG. 9 is a flowchart showing steps taken in a destination module informing an initiating module that a policy received from the initiating module is deprecated. Destination module processing commences at 900, whereupon a determination is made as to whether to attach an updated policy to a control message to be sent to the initiating policy (decision 905). For example, the destination module may have configuration parameters that instruct the destination module to send an updated policy to the initiating module when the destination module has the updated policy in its local cache. If the destination module determines to provide the updated policy, decision 905 branches to "Yes" branch 907, whereupon the destination module attaches the updated policy in the control message at step 910. On the other hand, if the destination module determines not to attach the updated policy, decision 905 branches to "No" branch 909, bypassing step 910.

A determination is made as to whether to process the data (forward the data) that was encapsulated with the physical path translation corresponding to the deprecated policy (decision 915). For example, if security requirements have not changed between the deprecated policy and the updated policy (e.g., pass through a firewall), the destination module may be configured to process the data. If the destination module determines not to process the data, decision 915 branches to "No" branch 917, whereupon the destination module includes an error message in the control message that indicates that the data was not forwarded to the destination module (step 920). On the other hand, if the destination module determines to process the data, decision 915 branches to "Yes" branch 919, bypassing step 920. The destination module sends the control message (step 925), which may include an updated policy and/or an error message, and returns at 930.

Initiating module processing commences at 935, whereupon the initiating module receives the control message at step 940. A determination is made as to whether the control message includes an updated policy (decision 945). If the control message includes an updated policy, decision 945 branches to "Yes" branch 947, whereupon the initiating module stores the updated policy in its local cache at step 950. On the other hand, if the control message does not include an updated policy, decision 945 branches to "No" branch 949, whereupon the initiating module proceeds through a series of steps to acquire an updated policy through a distributed policy service (pre-defined process block 955, see FIG. 8 and corresponding text for further details).

A determination is made as to whether the control message indicates that the destination module processed the data (e.g., forwarded the data to the destination virtual machine) (decision 960). If the destination module did not process the data, decision 960 branches to "No" branch 965, whereupon the initiating module encapsulates the data with the updated physical path translation corresponding to the updated policy and resends the data to the destination module at step 965, subsequently returning at 970. On the other hand, if the destination module processed the data from the initial data transmission, decision 960 branches to "Yes" branch 967, bypassing step 965 and returning at 970. In one embodiment, the initiating module or the destination module ensures that the packet is delivered to the destination virtual machine. In another embodiment, the data may be intentionally lost in order for the sending application or network layer to resend the data, in which case the initiating module uses the correct policy.

FIG. 10 is a table showing policies that correspond to initiating and destination virtual machines. Policy table 1000 includes policies 1010-1040, which logically dictate how different virtual machines (or external networks) communicate with each other (e.g., send data). Policy 1010 indicates that whenever virtual machine 1 sends data to a destination virtual machine, the data must go through a firewall. Note that the policy does not dictate a particular physically firewall, but rather logically dictates that it must go through a firewall. In one embodiment, policy table 1000 includes policies for a particular virtual network based upon the particular virtual network's unique identifier. In one embodiment, policy table includes information that refers virtual machines in a context of their corresponding virtual networks.

Policy 1020 dictates that whenever virtual machine 1, 2, or 5 sends data to virtual machine 7 or 8, that the data must be dropped. Policy 1030 dictates that whenever virtual machine 3 (from port 443) sends data to another virtual machine, that the data must pass through an SSL accelerator. Likewise, policy 1040 dictates that whenever the destination of data is virtual machine 3's port 443, that the data must pass through an SSL accelerator.

Figure 11:
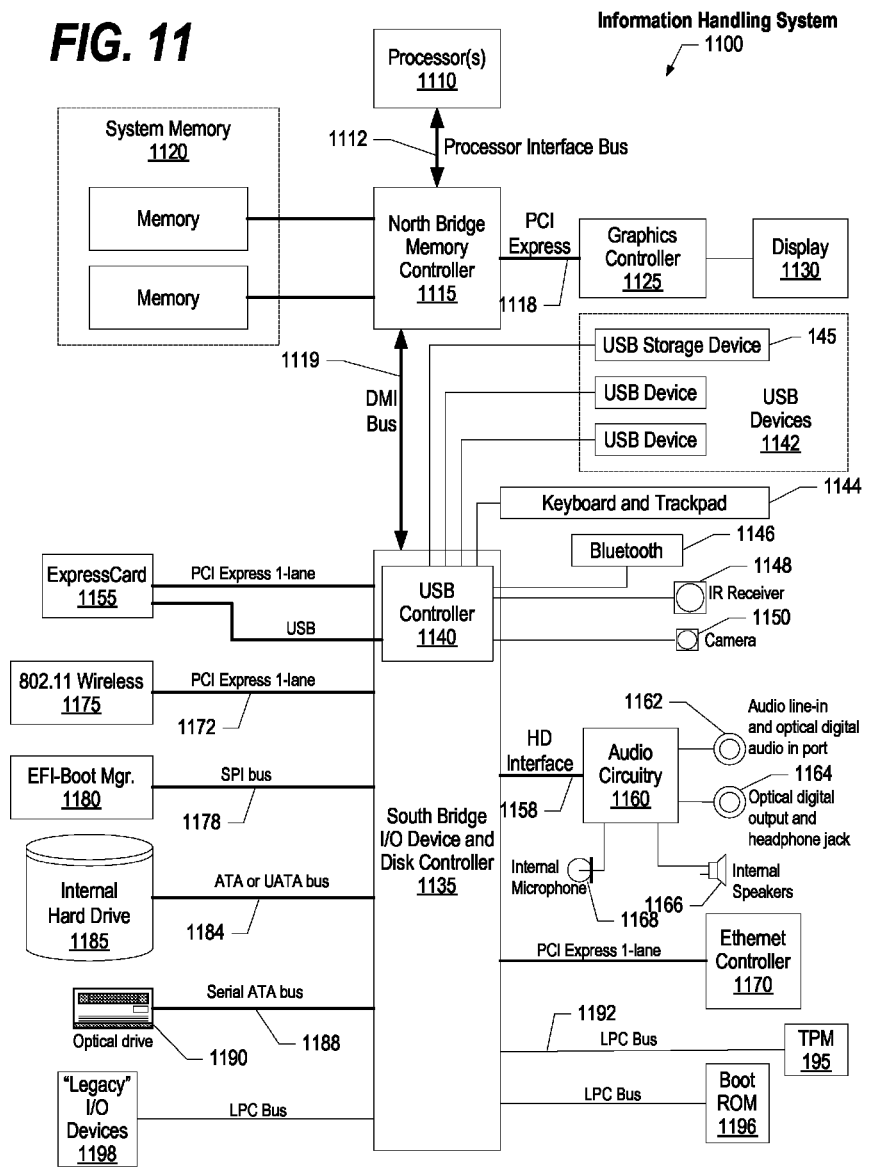
FIG. 11 is a block diagram of a data processing system in which the methods described herein can be implemented.

FIG. 11 illustrates information handling system 1100, which is a simplified example of a computer system capable of performing the computing operations described herein. Information handling system 1100 includes one or more processors 1110 coupled to processor interface bus 1112. Processor interface bus 1112 connects processors 1110 to Northbridge 1115, which is also known as the Memory Controller Hub (MCH). Northbridge 1115 connects to system memory 1120 and provides a means for processor(s) 1110 to access the system memory. Graphics controller 1125 also connects to Northbridge 1115. In one embodiment, PCI Express bus 1118 connects Northbridge 1115 to graphics controller 1125. Graphics controller 1125 connects to display device 1130, such as a computer monitor.

Northbridge 1115 and Southbridge 1135 connect to each other using bus 1119. In one embodiment, the bus is a Direct Media Interface (DMI) bus that transfers data at high speeds in each direction between Northbridge 1115 and Southbridge 1135. In another embodiment, a Peripheral Component Interconnect (PCI) bus connects the Northbridge and the Southbridge. Southbridge 1135, also known as the I/O Controller Hub (ICH) is a chip that generally implements capabilities that operate at slower speeds than the capabilities provided by the Northbridge. Southbridge 1135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 1196 and "legacy" I/O devices (using a "super I/O" chip). The "legacy" I/O devices (1198) can include, for example, serial and parallel ports, keyboard, mouse, and/or a floppy disk controller. The LPC bus also connects Southbridge 1135 to Trusted Platform Module (TPM) 1195. Other components often included in Southbridge 1135 include a Direct Memory Access (DMA) controller, a Programmable Interrupt Controller (PIC), and a storage device controller, which connects Southbridge 1135 to nonvolatile storage device 1185, such as a hard disk drive, using bus 1184.

ExpressCard 1155 is a slot that connects hot-pluggable devices to the information handling system. ExpressCard 1155 supports both PCI Express and USB connectivity as it connects to Southbridge 1135 using both the Universal Serial Bus (USB) the PCI Express bus. Southbridge 1135 includes USB Controller 1140 that provides USB connectivity to devices that connect to the USB. These devices include webcam (camera) 1150, infrared (IR) receiver 1148, keyboard and trackpad 1144, and Bluetooth device 1146, which provides for wireless personal area networks (PANs). USB Controller 1140 also provides USB connectivity to other miscellaneous USB connected devices 1142, such as a mouse, removable nonvolatile storage device 1145, modems, network cards, ISDN connectors, fax, printers, USB hubs, and many other types of USB connected devices. While removable nonvolatile storage device 1145 is shown as a USB-connected device, removable nonvolatile storage device 1145 could be connected using a different interface, such as a Firewire interface, etcetera.

Wireless Local Area Network (LAN) device 1175 connects to Southbridge 1135 via the PCI or PCI Express bus 1172. LAN device 1175 typically implements one of the IEEE 802.11 standards of over-the-air modulation techniques that all use the same protocol to wireless communicate between information handling system 1100 and another computer system or device. Optical storage device 1190 connects to Southbridge 1135 using Serial ATA (SATA) bus 1188. Serial ATA adapters and devices communicate over a high-speed serial link. The Serial ATA bus also connects Southbridge 1135 to other forms of storage devices, such as hard disk drives. Audio circuitry 1160, such as a sound card, connects to Southbridge 1135 via bus 1158. Audio circuitry 1160 also provides functionality such as audio line-in and optical digital audio in port 1162, optical digital output and headphone jack 1164, internal speakers 1166, and internal microphone 1168. Ethernet controller 1170 connects to Southbridge 1135 using a bus, such as the PCI or PCI Express bus. Ethernet controller 1170 connects information handling system 1100 to a computer network, such as a Local Area Network (LAN), the Internet, and other public and private computer networks.

While FIG. 11 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 1195) shown in FIG. 11 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 12.

Figure 12:
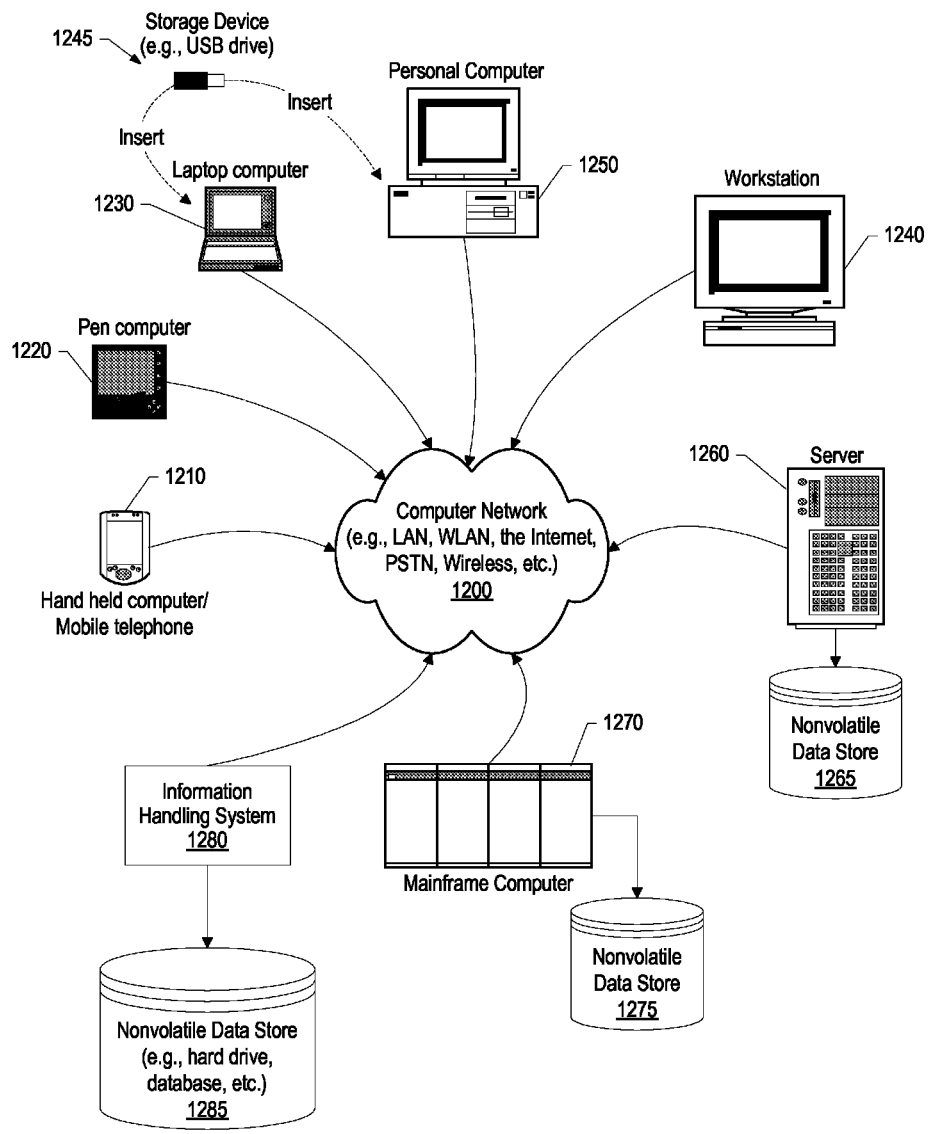
FIG. 12 provides an extension of the information handling system environment shown in FIG. 11 to illustrate that the methods described herein can be performed on a wide variety of information handling systems which operate in a networked environment, such as network routers, gateways and appliances.

FIG. 12 provides an extension of the information handling system environment shown in FIG. 11 to illustrate that the methods described herein can be performed on a wide variety of information handling systems that operate in a networked environment. Types of information handling systems range from small handheld devices, such as handheld computer/mobile telephone 1210 to large mainframe systems, such as mainframe computer 1270. Examples of handheld computer 1210 include personal digital assistants (PDAs), personal entertainment devices, such as MP3 players, portable televisions, and compact disc players. Other examples of information handling systems include pen, or tablet, computer 1220, laptop, or notebook, computer 1230, workstation 1240, personal computer system 1250, and server 1260. Other types of information handling systems that are not individually shown in FIG. 12 are represented by information handling system 1280. As shown, the various information handling systems can be networked together using computer network 1200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 12 depicts separate nonvolatile data stores (server 1260 utilizes nonvolatile data store 1265, mainframe computer 1270 utilizes nonvolatile data store 1275, and information handling system 1280 utilizes nonvolatile data store 1285). The nonvolatile data store can be a component that is external to the various information handling systems or can be internal to one of the information handling systems. In addition, removable nonvolatile storage device 1145 can be shared among two or more information handling systems using various techniques, such as connecting the removable nonvolatile storage device 1145 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
 retrieving, by a policy module, a deprecated policy from a local cache managed by the policy module;

encapsulating data, by the policy module, initiated by a first virtual machine with a deprecated physical path translation that corresponds to the deprecated policy;

sending the encapsulated data, by the policy module, to a second virtual machine through a destination policy module;

receiving, at the policy module, a message from the destination policy module that the deprecated policy is invalid;

sending a policy request, by the policy module, to a first policy server in response to receiving the message from the destination policy module that the deprecated policy is invalid;

receiving, at the first policy server, the policy request from the policy module;

identifying the first virtual machine and the second virtual machine that correspond to the policy request, wherein the first virtual machine is assigned to a first subnet and corresponds to a first virtual network, the first virtual network also including one or more third virtual machines assigned to a different subnet;

selecting a policy that corresponds to sending the data from the first virtual machine to the second virtual machine and includes one or more logical references to the first virtual network;

identifying a physical path translation that corresponds to the selected policy; and sending the physical path translation to the policy module.

2. The method of claim 1 wherein the message indicates that the second virtual machine has relocated from a first host computer system to a second host computer system.

3. An information handling system comprising:
one or more processors;
one or more memories coupled to at least one of the processors;
a set of computer program instructions stored in one or more of the memories and executed by at least one of the processors in order to perform actions of:

retrieving, by a policy module, a deprecated policy from a local cache managed by the policy module;

encapsulating data, by the policy module, initiated by a first virtual machine with a deprecated physical path translation that corresponds to the deprecated policy;

sending the encapsulated data, by the policy module, to a second virtual machine through a destination policy module;

receiving, at the policy module, a message from the destination policy module that the deprecated policy is invalid;

sending a policy request, by the policy module, to a first policy server in response to receiving the message from the destination policy module that the deprecated policy is invalid;

receiving, at the first policy server, the policy request from the policy module;

identifying the first virtual machine and the second virtual machine that correspond to the policy request, wherein the first virtual machine is assigned to a first subnet and corresponds to a first virtual network, the first virtual network also including one or more third virtual machines assigned to a different subnet;

selecting a policy that corresponds to sending the data from the first virtual machine to the second virtual machine and includes one or more logical references to the first virtual network;

identifying a physical path translation that corresponds to the selected policy; and sending the physical path translation to the policy module.

4. The information handling system of claim 3 wherein the message indicates that the second virtual machine has relocated from a first host computer system to a second host computer system.

5. A computer program product stored in a computer readable storage device, comprising computer program code that, when executed by an information handling system, causes the information handling system to perform actions comprising:

retrieving, by a policy module, a deprecated policy from a local cache managed by the policy module;

encapsulating data, by the policy module, initiated by a first virtual machine with a deprecated physical path translation that corresponds to the deprecated policy;

sending the encapsulated data, by the policy module, to a second virtual machine through a destination policy module;

receiving, at the policy module, a message from the destination policy module that the deprecated policy is invalid;

sending a policy request, by the policy module, to a first policy server in response to receiving the message from the destination policy module that the deprecated policy is invalid;

receiving, at the first policy server, the policy request from the policy module;

identifying the first virtual machine and the second virtual machine that correspond to the policy request, wherein the first virtual machine is assigned to a first subnet and corresponds to a first virtual network, the first virtual network also including one or more third virtual machines assigned to a different subnet;

selecting a policy that corresponds to sending the data from the first virtual machine to the second virtual machine and includes one or more logical references to the first virtual network;

identifying a physical path translation that corresponds to the selected policy; and sending the physical path translation to the policy module.

6. The computer program product of claim 5 wherein the message indicates that the second virtual machine has relocated from a first host computer system to a second host computer system.

* * * * *